United States Patent Office 2,855,389
Patented Oct. 7, 1958

2,855,389

ACETONE SOLUBLE COPOLYMERS

Anthony Sparks, Mitcham, England, assignor to The Distillers Company Limited, Edinburgh, Scotland, a British company No Drawing. Application December 14, 1955
Serial No. 552,974

Claims priority, application Great Britain
December 24, 1954

2 Claims. (Cl. 260—85.5)

The present invention relates to improvements in or relating to the production of vinylidene chloride/acrylonitrile copolymers. In particular it relates to the production of such copolymers which are readily dissolved in acetone which may, if necessary, be heated to aid the solution of the polymer.

It has been stated that when vinylidene chloride and acrylonitrile are copolymerised in a system in which the monomers are present in aqueous emulsion or suspension, the initial ratio of water to total monomers being between 5:1 and 10:1 by weight and the initial molar ratio of vinylidene chloride to acrylonitirle being between 3:1 and 1:3, acetone-soluble polymers of good quality can be obtained without the necessity of adding the acrylonitrile in stages or progressively removing unreacted vinylidene chloride. From such mixtures the resultant acetone-soluble copolymers have contained proportions of combined vinylidene chloride ranging from less than 50% to over 80% by weight.

It has further been stated that acetone-soluble copolymers are obtained by replacing a part of the vinylidene chloride with vinyl chloride in the copolymerisation of vinylidene chloride and acrylonitrile. Copolymers containing from 10 to 60% by weight of combined vinyl chloride and 50 to 20% by weight of combined acrylonitrile, the remainder being vinylidene chloride are said to be acetone-soluble.

It has now been found that in the preparation of vinylidene chloride/acrylonitrile copolymers which are acetone-soluble emulsion polymerisation techniques, although giving good products, suffer from the practical disadvantage that the recovery of the product is comparatively difficult owing to the emulsified form in which it is produced. In particular the emulsion has to be broken before the product can be recovered by normal methods and moreover it is difficult to ensure removal of the emulsifying agent.

The usual suspension polymerisation procedures, in which the polymerisation takes place in the dispersed monomer-phase, give rise to polymers in the form of beads which are therefore easily recoverable in a pure state. However, they suffer from the disadvantage that they are not completely homogeneous. They contain small portions of material which are not easily dissolved in acetone and, in some cases, are insoluble in acetone.

An object of the present invention is to provide an improved process for the production of acetone-soluble copolymers from vinylidene chloride and acrylonitrile. A further object is to provide a process in which the relative proportions of the two monomers entering the copolymer may be readily controlled.

Accordingly the present invention provides a process for the production of copolymers in the form of beads which comprises suspending a monomeric mixture comprising vinylidene chloride and acrylonitrile in such proportions that the resultant copolymer is soluble in acetone, throughout an aqueous phase containing an inorganic suspension stabiliser and sufficient quantities of a dissolved salt to reduce substantially the solubility of acrylonitrile therein, and polymerising the suspended monomeric mixture at an elevated temperature with the aid of a monomer-soluble polymerisation catalyst.

The vinylidene chloride and acrylonitrile may be present in any proportions which are known to give acetone-soluble products, for instance, the proportion of combined vinylidene chloride in the copolymer may range from less than 50% to over 80% by weight. If desired, some of the vinylidene chloride may be replaced with vinyl chloride or some other suitable copolymerisable monomer to give ternary copolymers which are soluble in acetone. When the third component is vinyl chloride acetone-soluble copolymers contain, for instance, 10 to 60% by weight vinyl chloride units and 50 to 20% by weight acrylonitrile units, the remainder being vinylidene chloride units. The solubility of a copolymer of vinylidene chloride and acrylonitrile in acetone depends, inter alia, upon its constitution. It is also well established that the constitution of a copolymer depends not only on the proportion of the monomers present in the monomer mixture from which it is formed, and their relative reactivities, but also on the degree to which the copolymerisation is allowed to proceed. It is thus possible to vary the acetone solubility of a copolymer produced by the process of the present invention from a given monomer mixture by varying the degree of polymerisation which occurs.

From the wide ranges of acetone-soluble copolymers which can be produced by the process of the present invention particularly valuable copolymers for the production of films and fibres are those consisting essentially of vinylidene chloride and acrylonitrile units in which the latter are present in a proportion by weight of about 40% to 50%.

If the proportion of acrylonitrile units is increased above about 50% the acetone solubility of the product is reduced, while if it is reduced below 40% those advantageous properties of the copolymer which make it valuable in the manufacture of films and fibres are diminished. Particularly valuable copolymers contain about 48% by weight of acrylonitrile units.

The process of the present invention is particularly useful for the preparation of copolymers having acrylonitrile contents between 40 and 50% by weight and it is found that there is no need to adopt special techniques such as adding the components at different rates to the polymerising suspension in order to obtain good yields of the desired products. They are formed most economically by the process of the present invention with the minimum wastage of unpolymerised monomers by starting with monomer mixtures containing from 50 to 60 parts by weight of vinylidene chloride and from 50 to 40 parts by weight of acrylonitrile. A preferred monomer mixture contains about 55 parts by weight of vinylidene chloride and about 45 parts by weight of acrylonitrile.

The volume of the aqueous phase in relation to the monomer mixture can be varied as is well known in connection with aqueous suspension polymerisation systems. Most conveniently the polymerisation system should contain from 1 to 3 volumes of aqueous phase per volume of monomer mixture.

Any of the known inorganic suspension stabilisers which have hitherto been suggested for use in the polymerisation of vinyl monomers may be used in the process of the present invention provided that it does not react with, or become inactivated by, the dissolved salt present in the aqueous phase. Particularly good results are obtained when finely divided magnesium hydroxide is used as suspension stabiliser. The quantity of stabiliser used may be varied considerably as is well known in the art of suspension polymerisation. Generally it is preferred to use as small a quantity of stabiliser as possible having regard for the stability of the suspension and, for instance, when magnesium hydroxide is employed, the preferred weight of stabiliser is about 0.5% by weight on the water in the aqueous phase which is present in about 1 to 3 volumes per one volume of monomer mixture.

It is known that the addition of soluble salts such as sodium chloride to water reduces the amount of acrylonitrile which can be dissolved therein at any given temperature. In the process of the present invention sufficient quantities of such a salt are added to the aqueous phase of the suspension polymerisation system to reduce substantially the solubility of the acrylonitrile therein. It is preferred that the amount of the salt added shall be such that the solubility of the acrylonitrile in the aqueous phase at the temperature of the polymerisation is at least halved. The precise amount of salt employed will depend on the nature of the product it is desired to produce and polymerisation conditions employed; by varying the amount of salt employed considerable control of the copolymerisation reaction and product can be achieved.

Often it is convenient to use a nearly saturated salt solution but care has to be taken to ensure that no difficulties arise due to crystallisation of the salt from the aqueous phase either during the polymerisation or subsequently during the processing of the resultant bead suspension should the temperature thereof be reduced. Particularly good results are obtained by using sodium chloride as the salt dissolved in the aqueous phase.

The copolymerisation of the monomeric mixture containing the vinylidene chloride and the acrylonitrile is brought about in the usual manner by the addition thereto of a monomer-soluble polymerisation catalyst after which the mixture is heated. By a monomer-soluble catalyst is meant a catalyst which is considerably more soluble in the monomer than in the water phase. The preferred catalysts are substantially insoluble in the aqueous phase and, as examples, may be mentioned the substantially water-insoluble organic peroxides such as benzoyl peroxide, ortho-chlorbenzoyl peroxide and lauryl peroxide.

The temperature at which the copolymerisation is carried out may be varied considerably depending on the rate of polymerisation required, the amount of polymerisation catalyst employed and the physical properties it is desired that the final product should possess. If temperatures above the boiling points of any of the components of the system are used, super atmospheric pressures have to be employed in order to maintain the liquid phases. Most suitably the polymerisation is carried out at a temperature in the range 40 to 90° C.

As is customary in polymerisation reactions it is preferred to carry out the polymerisation in the absence of molecular oxygen and this is most suitably achieved by displacing the air in the polymerisation vessel with an inert gas such as nitrogen. Preferably the inert gas is employed at a super atmospheric pressure.

The copolymer beads produced by the process of the present invention are recovered and washed by any of the usual techniques.

The products are particularly useful for the production of acetone solutions from which films and fibres of the vinylidene chloride/acrylonitrile copolymers can be prepared by any of the known wet casting or spinning techniques.

The following examples illustrate the process of the present invention.

Examples 1–8

In each of these examples 275 grams of vinylidene chloride were mixed with 225 grams of acrylonitrile and 1.0% of benzoyl peroxide was added. This oil phase was dispersed in 1250 millilitres of water containing varying quantities of dissolved sodium chloride (see table below) and 0.5% by weight on the water present of magnesium hydroxide which had been formed in situ by the addition of sodium hydroxide to magnesium chloride in solution. The suspension was maintained by the action of a stirrer rotating at 400 R. P. M. and polymerisation was brought about by heating the suspension to an elevated temperature and for the periods indicated in the table below. In all the examples nitrogen was used to displace oxygen from the polymerisation vessel and in some cases the polymerisation was carried out under super atmospheric pressures.

At the end of the polymerisation period the suspension was discharged from the reaction vessel and well washed with water. The beads were then washed with dilute hydrochloric acid solution and stirred for 30 minutes to remove any residual magnesium hydroxide. The beads were finally washed with water until free from chloride ions and then dried in a vacuum oven at 50 to 60° C. The results obtained are shown in the following table:

| Example | Wt. of NaCl in aqueous phase in grams | Nitrogen pressure in lbs./sq. in. | Polymerisation Temp., °C. | Polymerisation Time, Hrs. | Yield, Percent | Percent by weight of acrylonitrile units in copolymer |
|---|---|---|---|---|---|---|
| 1 | 475 | Atmospheric | 70 | 4 | 74.6 | 43.9 |
| 2 | 425 | do | 70 | 4 | 84.3 | 44.4 |
| 3 | 425 | do | 65 | 4 | 85 | 44.0 |
| 4 | 400 | do | 70 | 4 | 82.1 | 45.6 |
| 5 | 400 | 20 | 70 | 5 | 81.7 | 44.6 |
| 6 | 400 | 40 | 70 | 2.5 | 78.9 | 44.3 |
| 7 | 400 | 60 | 70 | 5 | 82.9 | 44.9 |
| 8 | 400 | Atmospheric | 65 | 5 | 80.1 | 44.5 |

In all the above examples the product was in the form of yellowish-white beads which readily dissolved in acetone to give solutions from which films and fibres were produced by known procedures. The yield indicated is a percentage of the theoretical yield.

Instead of using the proportions given in the above examples, I may use a monomer mixture of vinylidene chloride and acrylonitrile containing a range of 50 to 60 parts by weight of vinylidene chloride and from 50 to 40 parts by weight of acrylonitrile. Such range produces a copolymer containing about 40% to about 50% of acrylonitrile units. Any one of the peroxide catalysts mentioned hereinbefore can be used with temperatures varying from 40 to 90° under pressures such as given in the table above and using the proportions of water mentioned hereinbefore, together with the inorganic stabilisers mentioned and with the proportions of sodium chloride or similar salt employed. Copolymers made under the varying conditions given hereinbefore give about the same results as obtained using the examples.

When the same relative quantities of monomers were copolymerised under similar conditions using a suspension process in which an inorganic stabiliser was employed in the absence of a dissolved salt in the aqueous phase or in which an organic stabiliser was employed, inferior products were obtained which were not so completely soluble in acetone and which had slightly lower acrylonitrile unit contents. Such products were also inferior with regard to their spinning properties.

I claim:

1. In the process for forming beaded copolymers by polymerizing a suspension of a monomeric mixture in aqueous phase of 50 to 60 parts of vinylidene chloride and 50 to 40 parts of acrylonitrile, the aqueous phase containing one to three volumes of water to one of said mixture with a monomer-soluble catalyst and an inorganic water insoluble suspension stabilizer at a temperature of 40–90° C. to form a copolymer having a small amount insoluble in acetone, the step which consists in adding a water-soluble inorganic salt to said mixture, inert to said polymerizing action, in sufficient quantity at least to halve the solubility of the acrylonitrile in the aqueous phase, to produce a copolymer completely soluble in acetone.

2. In the process for forming beaded copolymers by polymerizing a suspension of a monomeric mixture in aqueous phase of 50 to 60 parts of vinylidene chloride and 50 to 40 parts of acrylonitrile, the aqueous phase containing one to three volumes of water to one of said mixture with a monomer-soluble catalyst and an inorganic water insoluble suspension stabilizer at a temperature of 40–90° C. to form a copolymer having a small amount insoluble in acetone, the step which consists in adding sodium chloride to said mixture in sufficient quantity at least to halve the solubility of the acrylonitrile in the aqueous phase, to produce a copolymer completely soluble in acetone.

References Cited in the file of this patent

FOREIGN PATENTS 643,198    Great Britain _____ Sept. 15, 1950

OTHER REFERENCES

Schildknecht Vinyl and Related Polymers, pages 18 and 211 published 1952, John Wiley & Sons Inc., New York, N. Y. (Copy in Scientific Library.)